United States Patent
Rathinasamy et al.

(10) Patent No.: US 11,422,324 B2
(45) Date of Patent: Aug. 23, 2022

(54) MECHANICAL CABLE RELEASE IN TRANSCEIVER

(71) Applicant: Dell Products L.P., Round Rock, TX (US)

(72) Inventors: Shree Rathinasamy, Round Rock, TX (US); Victor B. Teeter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 36 days.

(21) Appl. No.: 17/144,966

(22) Filed: Jan. 8, 2021

(65) Prior Publication Data

US 2022/0221656 A1    Jul. 14, 2022

(51) Int. Cl.
| G02B 6/42 | (2006.01) |
| H01R 13/58 | (2006.01) |
| G02B 6/38 | (2006.01) |

(52) U.S. Cl.
CPC ....... *G02B 6/4292* (2013.01); *H01R 13/5829* (2013.01); *G02B 6/3887* (2013.01); *G02B 6/3893* (2013.01)

(58) Field of Classification Search
None
See application file for complete search history.

(56) References Cited

U.S. PATENT DOCUMENTS

| 4,986,625 | A | * | 1/1991 | Yamada | G02B 6/3817 385/55 |
| 5,185,839 | A | * | 2/1993 | Newell | G02B 6/2804 385/139 |
| 5,588,080 | A | * | 12/1996 | Kawamura | G02B 6/3855 385/72 |
| 6,431,763 | B1 | * | 8/2002 | Sherman | G02B 6/4292 385/62 |

(Continued)

FOREIGN PATENT DOCUMENTS

EP    0508674 A2 * 10/1992
JP    8-7939 A * 1/1996

*Primary Examiner* — Michael Stahl
(74) *Attorney, Agent, or Firm* — Jackson Walker L.L.P.

(57) ABSTRACT

An active device module may include an active device, a housing configured to house the active device, a slide release latch mechanically coupled to the housing via a spring having a spring force that biases the slide release latch in a first position relative to the housing, and connectivity flaps mechanically coupled to the slide release latch via activation levers, wherein when the slide release latch is in the first position and a cable is inserted into the active device module, the connectivity flaps apply a compressive force to either side of the cable to mechanically maintain the cable within the active device module. The housing, the slide release latch, the activation levers, and the connectivity flaps may be arranged such that, when an external force is applied to the slide release latch to overcome the spring force of the spring to cause the slide release latch to move from the first position to a second position relative to the housing, the slide release latch exerts mechanical force on the activation (Continued)

levers, which in turn applies a force to the connectivity flaps, pulling at least a portion of each connectivity flap away from another connectivity flap, thereby reducing the compressive force retaining the cable between the connectivity flaps.

9 Claims, 8 Drawing Sheets

(56) References Cited

U.S. PATENT DOCUMENTS

| | | | | |
|---|---|---|---|---|
| 7,927,023 | B2 * | 4/2011 | Moriarty | G02B 6/3809 |
| | | | | 385/139 |
| 2012/0017400 | A1 * | 1/2012 | Ussher | F16G 11/106 |
| | | | | 24/136 L |
| 2014/0112624 | A1 * | 4/2014 | Doyle | G02B 6/3858 |
| | | | | 385/81 |
| 2017/0229814 | A1 * | 8/2017 | Jimenez, III | H01R 12/721 |

* cited by examiner

MECHANICAL CABLE RELEASE IN TRANSCEIVER

TECHNICAL FIELD

The present disclosure relates in general to information handling systems, and more particularly to systems and methods for providing a mechanical cable release in a transceiver, such as a cable associated with an optical transceiver module.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have a network interface or other input/output (I/O) interface configured to receive an optical transceiver module (e.g., a small form-factor pluggable (SFP) transceiver or a quad small form-factor pluggable (QSFP) transceiver of any I/O speed). Such transceiver modules often plug into "cages" disposed on an I/O interface card, which often reside in the rear of the information handling system.

Fiber optic cables (such as Multi-Fiber Push On or "MPO") are increasingly used in data centers as network speeds are increasing at dramatic rates. The cables used are typically of different makes and models. Existing fiber cables include tabs for removing such cables from transceivers. The cable release may be present only at the cable. Fiber optic cables used in test equipment in data centers, vendor test laboratories, and other locations may require frequent plugging in and removing of the cables from the transceivers. Many problems may occur with frequent removal and plugging in of cables, including:

- the tabs used to pull out or release the cable often break off easily;
- frequent handling of cables may increase the likelihood of tabs breaking off;
- tabs are usually made of plastic, rubber or other materials and are prone to breaking or snapping;
- removing a cable with a damaged tab from the transceiver often requires force;
- forcibly removing a cable with a broken tab may cause damage to the cable itself;
- forcibly removing a cable with a broken tab may cause damage to the transceiver;
- forcibly removing a cable with a broken tab may cause damage to the transceiver port;
- damage to the cable, transceiver, or port may result in technical support calls;
- damage to the cable, transceiver, or port may extend customer down time; and
- cables with broken tabs may be discarded, increasing cost.

Accordingly, cable and transceiver designs that enable easier removal of cables from a transceiver may be desirable.

SUMMARY

In accordance with the teachings of the present disclosure, the disadvantages and problems associated with traditional mechanical cable release mechanisms for an information handling system may be reduced or eliminated.

In accordance with embodiments of the present disclosure, an active device module may include an active device, a housing configured to house the active device, a slide release latch mechanically coupled to the housing via a spring having a spring force that biases the slide release latch in a first position relative to the housing, and connectivity flaps mechanically coupled to the slide release latch via activation levers, wherein when the slide release latch is in the first position and a cable is inserted into the active device module, the connectivity flaps apply a compressive force to either side of the cable to mechanically maintain the cable within the active device module. The housing, the slide release latch, the activation levers, and the connectivity flaps may be arranged such that, when an external force is applied to the slide release latch to overcome the spring force of the spring to cause the slide release latch to move from the first position to a second position relative to the housing, the slide release latch exerts mechanical force on the activation levers, which in turn applies a force to the connectivity flaps, pulling at least a portion of each connectivity flap away from another connectivity flap, thereby reducing the compressive force retaining the cable between the connectivity flaps.

In accordance with these and other embodiments of the present disclosure, a method for fabricating an active device module may include housing an active device within a housing, mechanically coupling a slide release latch to the housing via a spring having a spring force that biases the slide release latch in a first position relative to the housing, mechanically coupling connectivity flaps to the slide release latch via activation levers, wherein when slide release latch is in the first position and a cable is inserted into the active device module, the connectivity flaps applying a compressive force to either side of the cable to mechanically maintain the cable within the active device module, and arranging the housing, the slide release latch, the activation levers, and the connectivity flaps such that, when an external force is applied to the slide release latch to overcome the spring force of the spring to cause the slide release latch to move from the first position to a second position relative to the housing, the slide release latch exerts mechanical force on the activation levers, which in turn applies a force to the connectivity flaps, pulling at least a portion of each connectivity flap away from another connectivity flap, thereby reducing the compressive force retaining the cable between the connectivity flaps.

In accordance with these and other embodiments of the present disclosure, an information handling system, may include a processor and an active device module communicatively coupled to the processor. The active device module may include an active device, a housing configured to house the active device, a slide release latch mechanically coupled to the housing via a spring having a spring force that biases the slide release latch in a first position relative to the housing, and connectivity flaps mechanically coupled to the slide release latch via activation levers, wherein when the slide release latch is in the first position and a cable is inserted into the active device module, the connectivity flaps apply a compressive force to either side of the cable to mechanically maintain the cable within the active device module. The housing, the slide release latch, the activation levers, and the connectivity flaps may be arranged such that, when an external force is applied to the slide release latch to overcome the spring force of the spring to cause the slide release latch to move from the first position to a second position relative to the housing, the slide release latch exerts mechanical force on the activation levers, which in turn applies a force to the connectivity flaps, pulling at least a portion of each connectivity flap away from another connectivity flap, thereby reducing the compressive force retaining the cable between the connectivity flaps.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 7C, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

Figure 1:
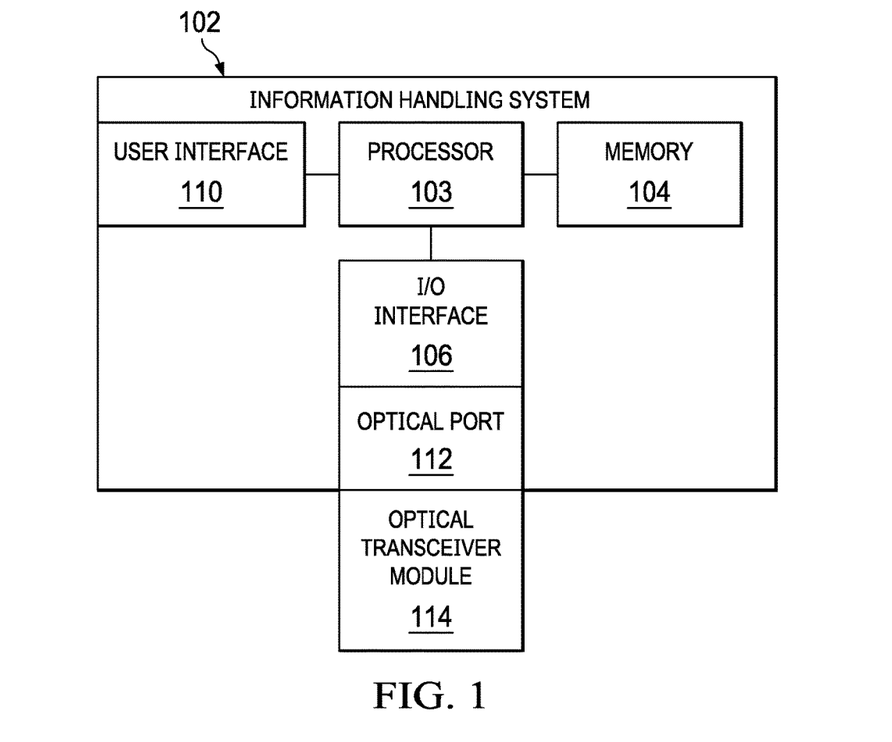
FIG. 1 illustrates a block diagram of selected components of an example information handling system, in accordance with embodiments of the present disclosure.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data. In yet other embodiments, information handling system 102 may comprise a server. In further embodiments, information handling system 102 may comprise a network switch.

As depicted in FIG. 1, information handling system 102 may include a processor 103, a memory 104 communicatively coupled to processor 103, an input/output interface 106 communicatively coupled to processor 103, a user interface 110 communicatively coupled to processor 103, and an optical port 112 communicatively coupled to I/O interface 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

I/O interface 106 may comprise any suitable system, apparatus, or device operable to serve as an interface between information handling system 102 and one or more other external devices. For example, in some embodiments, I/O interface 106 may comprise a network interface configured to serve as an interface between information handling system 102 and information handling systems via a network, in which case I/O interface 106 may comprise a network interface card, or "NIC."

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Optical port 112 may comprise an electrical connector in the form of any suitable combination of a jack, a socket, and/or "cage" for receiving a corresponding connector of an optical transceiver module 114.

Optical transceiver module 114 may include any system, device, or apparatus that houses and includes an optical transceiver configured to convert an incoming optical signal into an equivalent electrical signal, and communicate such equivalent electrical signal to I/O interface 106, and also configured to receive an electrical signal from I/O interface 106, convert such electrical signal into an equivalent optical signal, and communicate such optical signal as an outgoing optical signal (e.g., via an optical cable, which may be integral to the same assembly as optical transceiver module 114). Optical transceiver module 114 may include an SFP transceiver, a QSFP transceiver, or any other suitable form factor.

In addition to processor 103, memory 104, I/O interface 106, user interface 110, optical port 112, and optical transceiver module 114, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
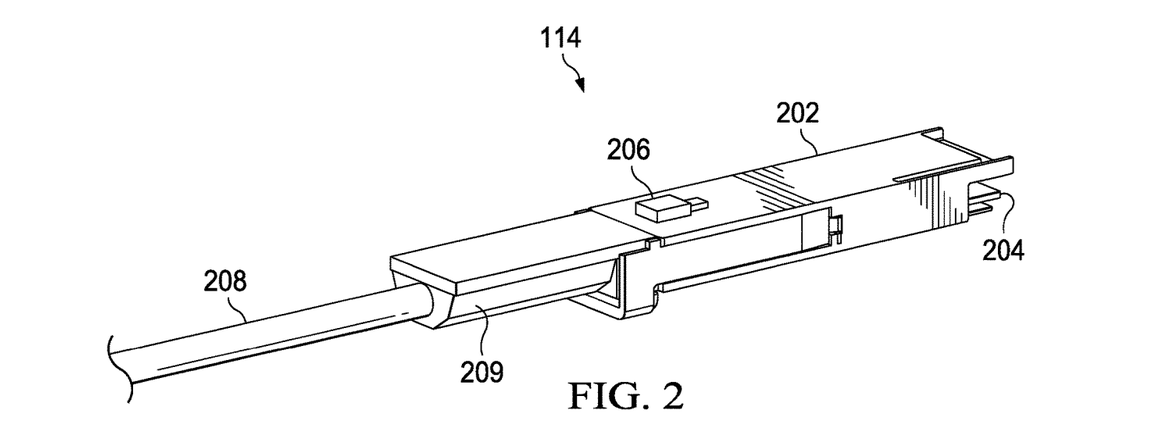
FIG. 2 illustrates a perspective view of an example optical transceiver module, in accordance with embodiments of the present disclosure.

FIG. 2 illustrates a perspective view of an example optical transceiver module 114 and cable 208 inserted into optical transceiver module 114, in accordance with embodiments of the present disclosure. In some embodiments, example optical transceiver module 114 depicted in FIG. 2 may be used to implement optical transceiver module 114 of FIG. 1. As shown in FIG. 2, optical transceiver module 114 may include a housing 202 for housing an optical transceiver 204 and one or more other components, a cable 208, and a strain relief feature 209. Housing 202 may comprise a metal enclosure configured to house and/or provide mechanical structure for optical transceiver 204, including mechanical features (e.g., guiding features) for aligning and/or mechanically securing optical transceiver 204 to I/O interface 106 via optical port 112. Further, housing 202 may also include a slide release latch 206 mechanically coupled thereto.

Optical transceiver 204 may include any system, device, or apparatus configured to receive an incoming optical signal (e.g., via cable 208), convert the incoming optical signal into an equivalent electrical signal, and communicate such equivalent electrical signal to I/O interface 106 (e.g., via optical port 112), and also configured to receive an electrical signal from I/O interface 106 (e.g., via optical port 112), convert such electrical signal into an equivalent optical signal, and communicate such optical signal as an outgoing optical signal (e.g., via cable 208).

Slide release latch 206 may be slidably coupled to housing 202 and may include any system, device, or apparatus configured to slide in a linear direction between a first position and a second position, wherein slide release latch 206 may be configured to: (a) mechanically retain cable 208 within optical transceiver module 114 when in the first position, and (b) mechanically release cable 208 from optical transceiver module 114 when interacted upon by a user to move slide release latch 206 from the first position to the second position, as described in greater detail below. Also as described in greater detail below, slide release latch 206 may be biased in the first position by a spring coupling slide release latch 206 to housing 202, and may be moved from the first position to the second position by a mechanical force, for example a mechanical force applied by a user, that overcomes a spring force of the spring.

Cable 208 may include any suitable system, device, or apparatus capable of passing optical signals therethrough.

For example, cable 208 may include one or more optical fibers surrounded by optically opaque material and/or material for protecting such one or more optical fibers. Such one or more optical fibers integral to cable 208 may be optically coupled to optical transceiver 204, thus enabling communication with optical transceiver 204 via such optical fibers.

Strain relief feature 209 may mechanically enclose cable 209 and may be formed from any suitable material that may be configured to provide strain relief to cable 208 while also providing support to the extension of housing 202.

Figure 3:
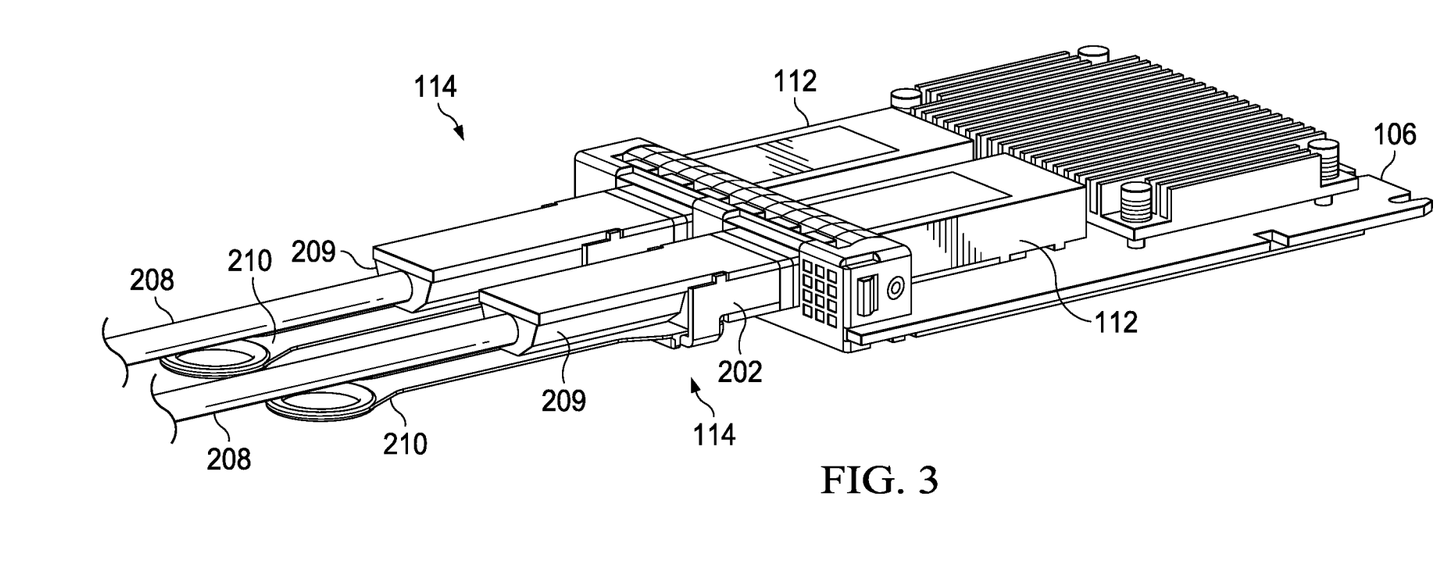
FIG. 3 illustrates a perspective view of two instances of the example optical transceiver module shown in FIG. 2 inserted into respective optical ports of an I/O interface, in accordance with embodiments of the present disclosure.

FIG. 3 illustrates a perspective view of two instances of example optical transceiver module 114 shown in FIG. 2 inserted into respective optical ports 112 of I/O interface 106, in accordance with embodiments of the present disclosure.

Figure 4A:
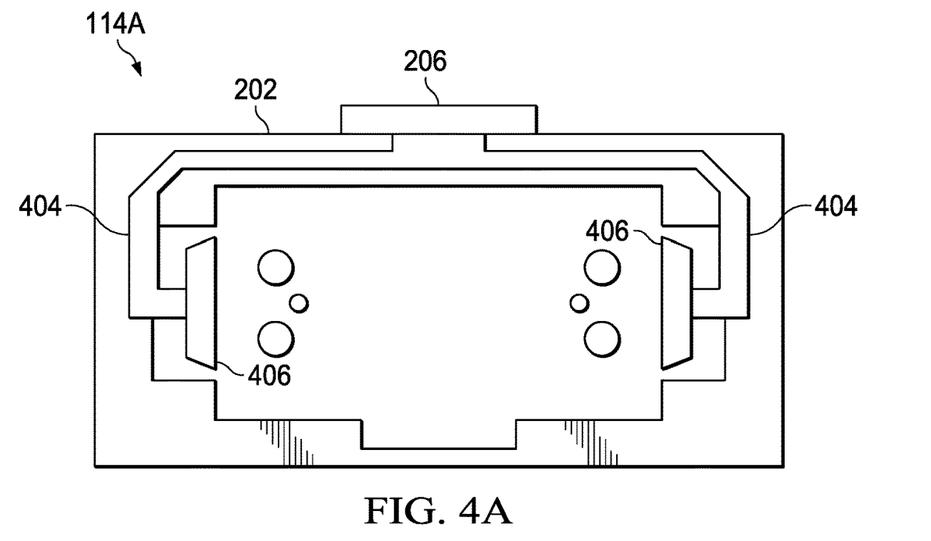
FIGS. 4A-4C illustrate different views of an example optical transceiver module with a slide release latch thereof in a first position, in accordance with embodiments of the present disclosure.
Figure 4B:
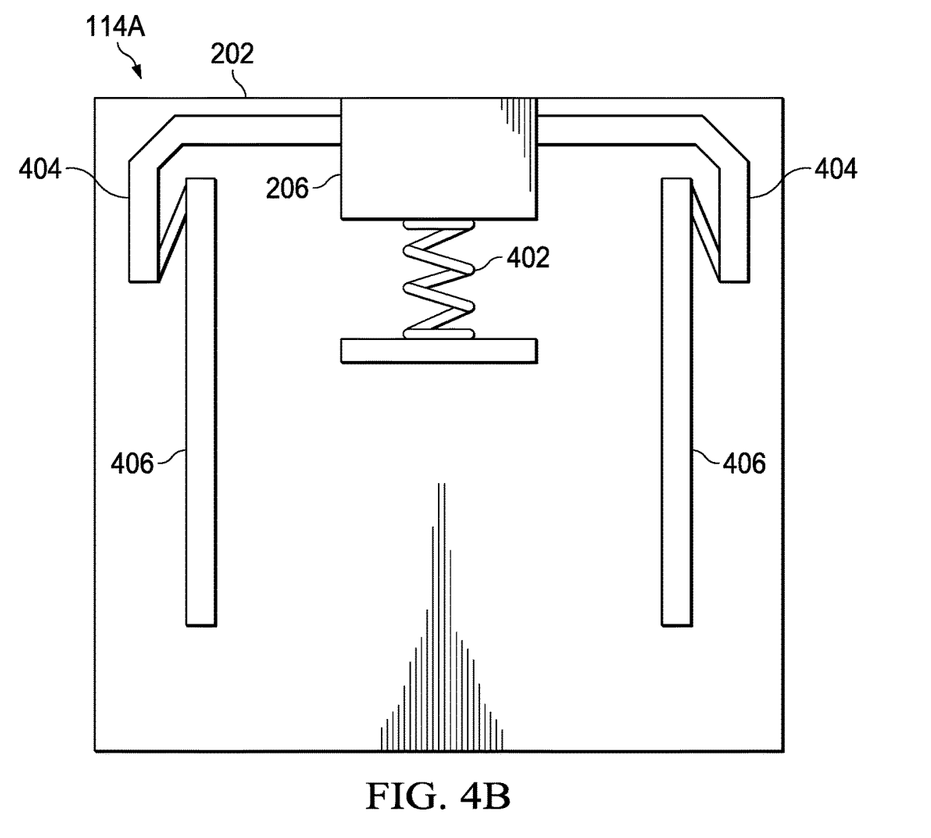
Figure 4C:
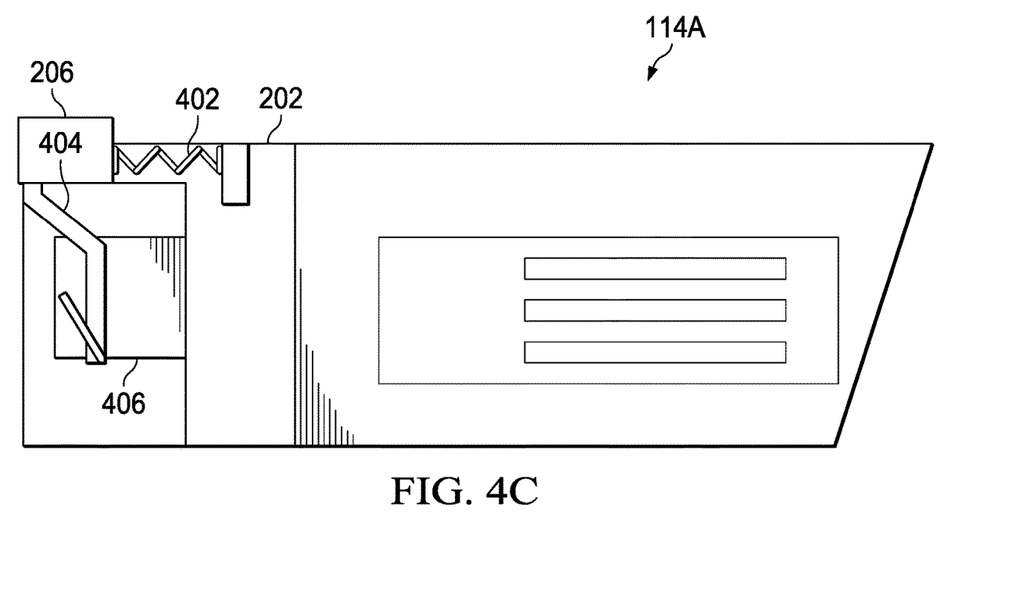

FIGS. 4A-4C illustrate different views of an example optical transceiver module 114A with slide release latch 206 in a first position, in accordance with embodiments of the present disclosure. FIG. 4A illustrates a front elevation view of optical transceiver module 114A, FIG. 4B illustrates a top plan view of optical transceiver module 114A, and FIG. 4C illustrates a side elevation view of optical transceiver module 114A. Optical transceiver module 114A shown in FIGS. 4A-4C may be used to implement optical transceiver 114 of FIGS. 1 and 2. As shown in FIGS. 4A-4C, slide release latch 206 may be coupled to housing 202 via a spring 402 that biases slide release latch 206 in the first position relative to housing 202. Slide release latch 206 may further be coupled to activation levers 404 which may mechanically interface between slide release latch 206 and connectivity flaps 406 of optical transceiver module 114A. When slide release latch 206 is in the first position, and a cable 208 in inserted into optical transceiver module 114A, connectivity flaps 406 may apply force to either side of the cable 208, thus mechanically maintaining the cable 208 within optical transceiver module 114A.

Figure 5A:
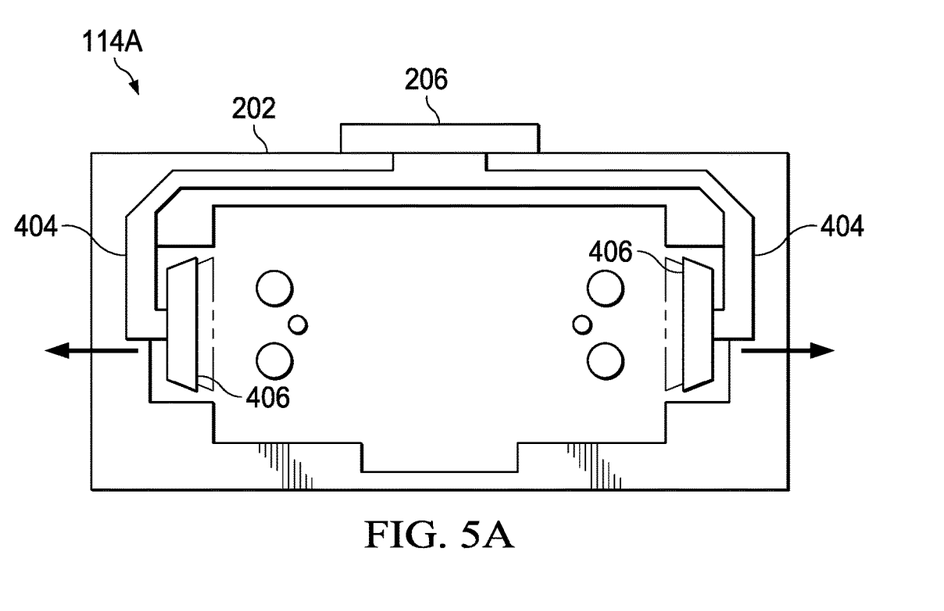
FIGS. 5A-5C illustrate different views of the example optical transceiver module shown in FIGS. 4A-4C with the slide release latch thereof in a second position, in accordance with embodiments of the present disclosure.
Figure 5B:
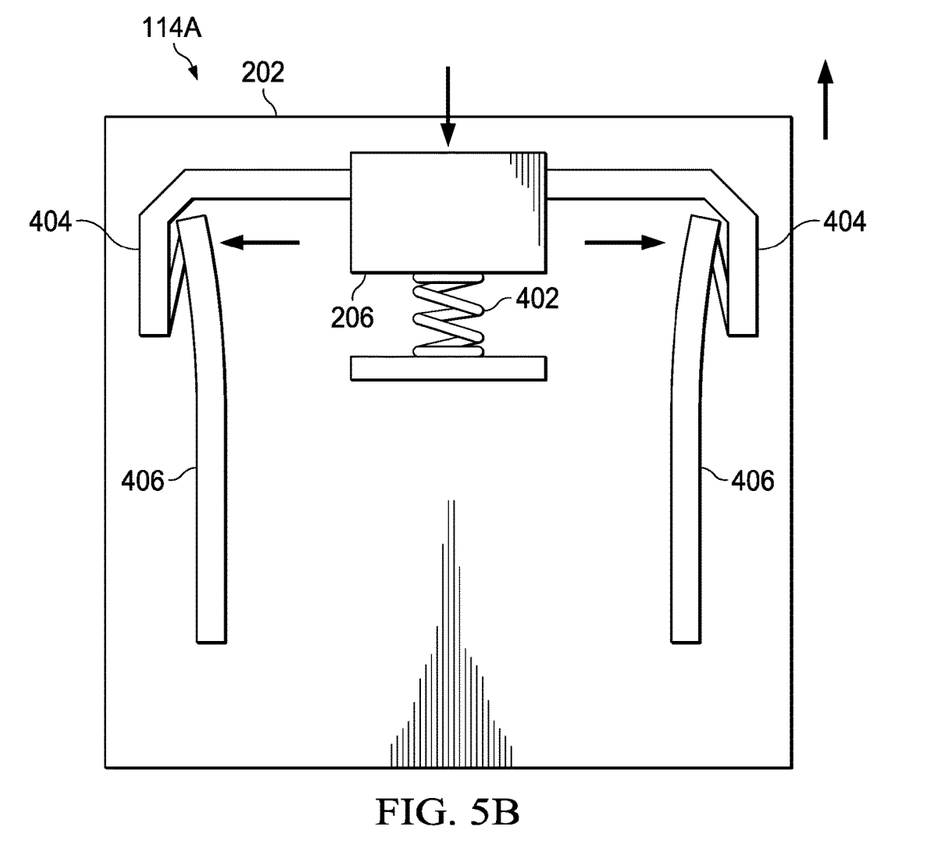
Figure 5C:
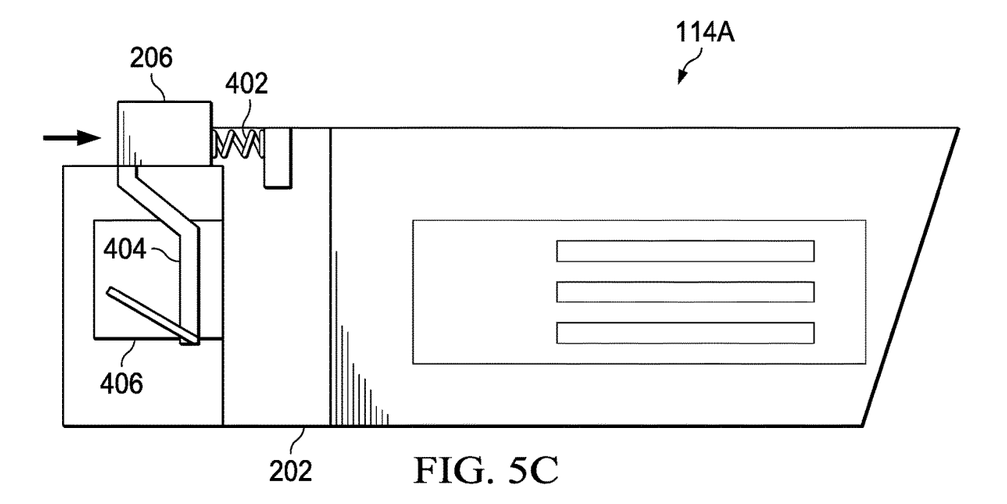

In operation, a user may apply a force to slide release latch 206 to overcome the spring force of spring 402 to cause slide release latch 206 to move from the first position to a second position. FIGS. 5A-5C illustrate different views of example optical transceiver module 114A shown in FIGS. 4A-4C with slide release latch 206 in a second position, in accordance with embodiments of the present disclosure. FIG. 5A illustrates a front elevation view of optical transceiver module 114A, FIG. 5B illustrates a top plan view of optical transceiver module 114A, and FIG. 5C illustrates a side elevation view of optical transceiver module 114A.

As shown in FIGS. 5A-5C, when a force is applied to slide release latch 206 to move it from the first position to the second position, slide release latch 206 may exert a force on activation levers 404, which in turn apply a force to connectivity flaps 406, pulling at least a portion of each connectivity flap 406 away from the other connectivity flap 406. Such motion of connectivity flaps 406 may reduce the compressive force retaining cable 208 between connectivity flaps 406, allowing a user to apply a small force to cable 208 in order to remove it from optical transceiver module 114A.

In some embodiments, slide release latch 206 may be enclosed or covered by a protective casing or cover in order to prevent accidental release of cable 208 from optical transceiver module 114A.

Figure 6A:
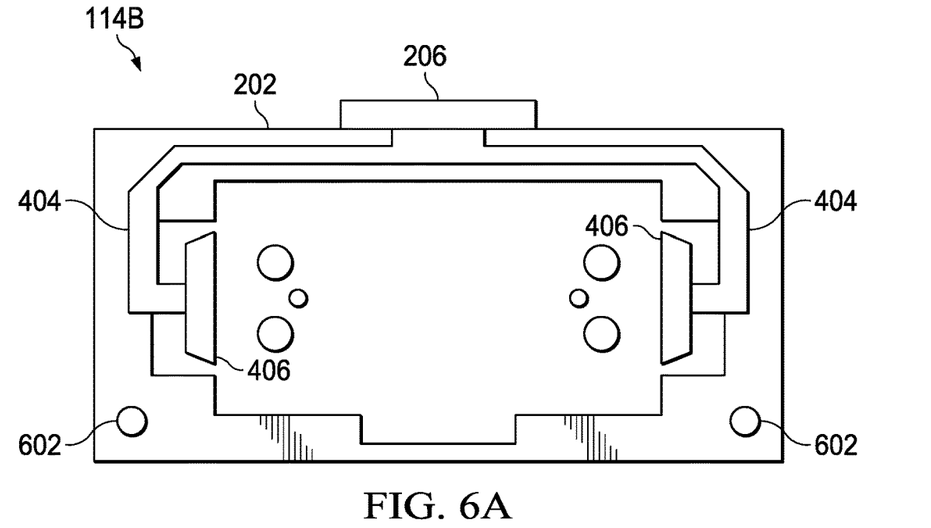
FIGS. 6A-6C illustrate different views of another example optical transceiver module with a slide release latch thereof in a first position, in accordance with embodiments of the present disclosure.
Figure 6B:
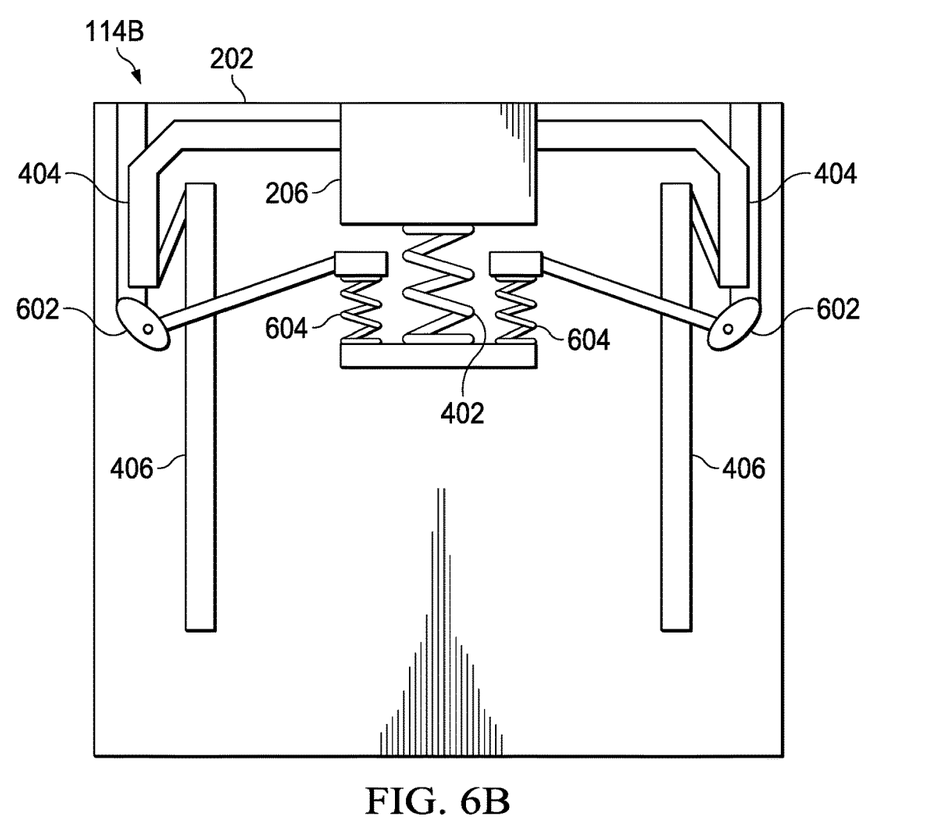
Figure 6C:
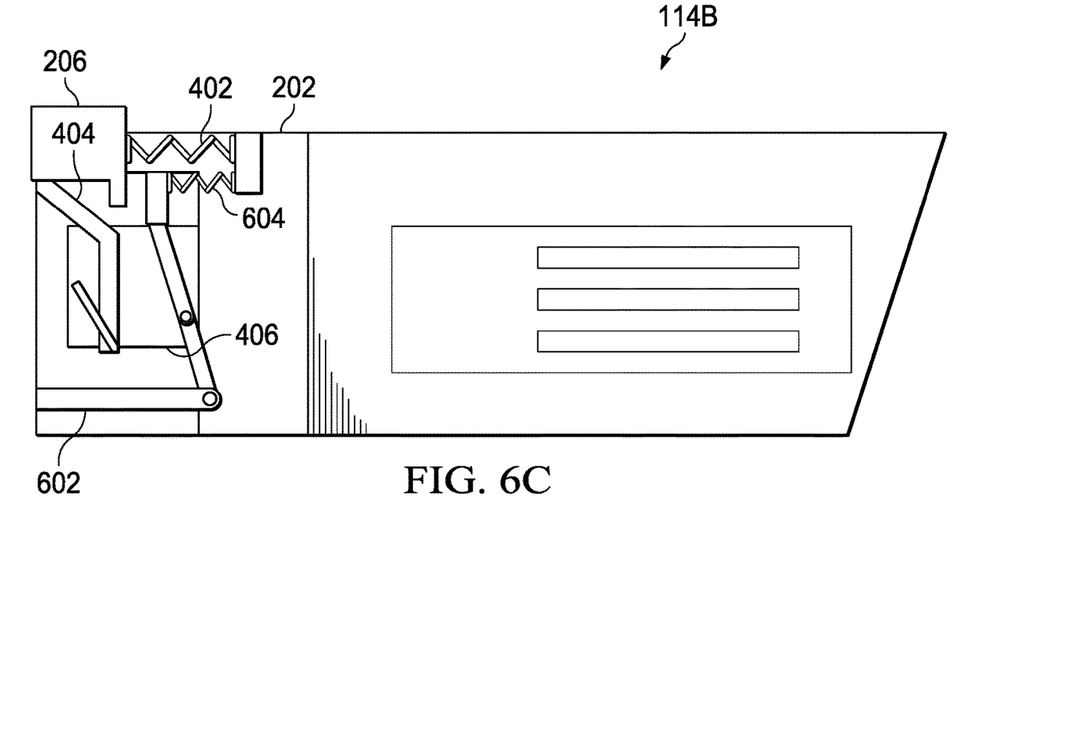

FIGS. 6A-6C illustrate different views of an example optical transceiver module 114B with slide release latch 206 in a first position, in accordance with embodiments of the present disclosure. FIG. 6A illustrates a front elevation view of optical transceiver module 114B, FIG. 6B illustrates a top plan view of optical transceiver module 114B, and FIG. 6C illustrates a side elevation view of optical transceiver module 114B. Optical transceiver module 114B shown in FIGS. 6A-6C may be used to implement optical transceiver 114 of FIGS. 1 and 2. Optical transceiver module 114B may be similar in many respects to optical transceiver module 114A, and thus, only the main differences between optical transceiver module 114B and optical transceiver module 114A may be described below.

As shown in FIGS. 6A-6C, in addition to those features of optical transceiver module 114A described above, optical transceiver module 114B may include one or more push levers 602 mechanically coupled to housing 202 via one or more springs 604 that bias the one of more push levers 602 in a resting position relative to housing 202. As a user applies force to translate slide release latch 206 from the first position to the second position, slide release latch 206 may come into physical contact with the one or more push levers 602, and slide release latch 206 may apply force to the one or more push levers 602 to overcome the spring force of the one or more springs 604.

Figure 7A:
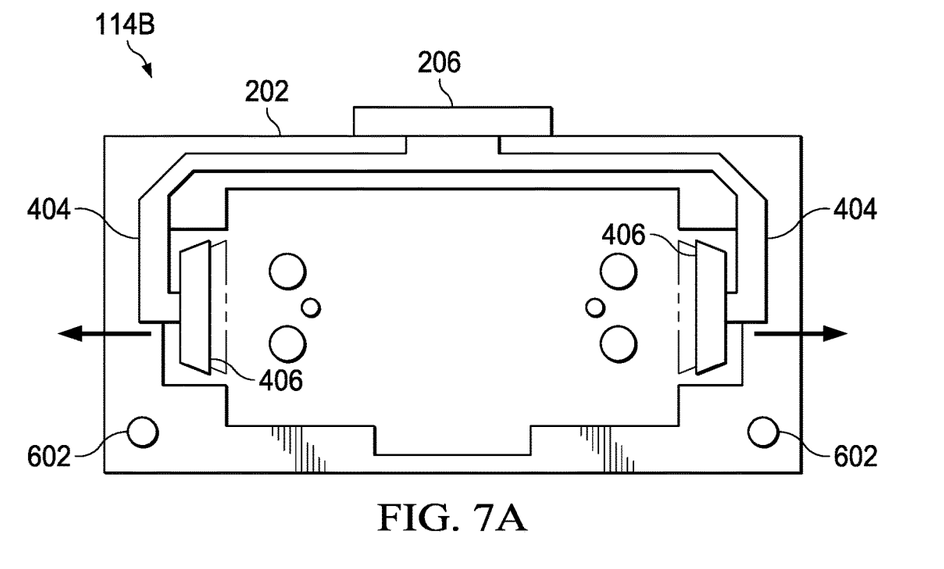
FIGS. 7A-7C illustrate different views of the example optical transceiver module shown in FIGS. 6A-6C with the slide release latch thereof in a second position, in accordance with embodiments of the present disclosure.
Figure 7B:
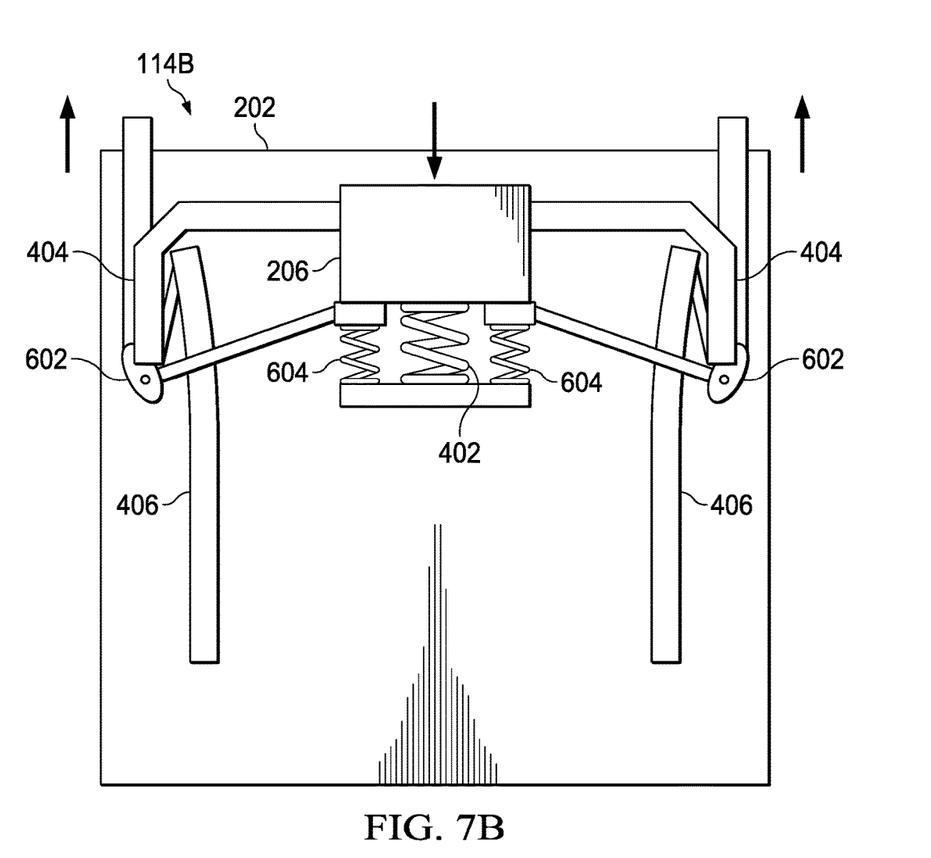
Figure 7C:
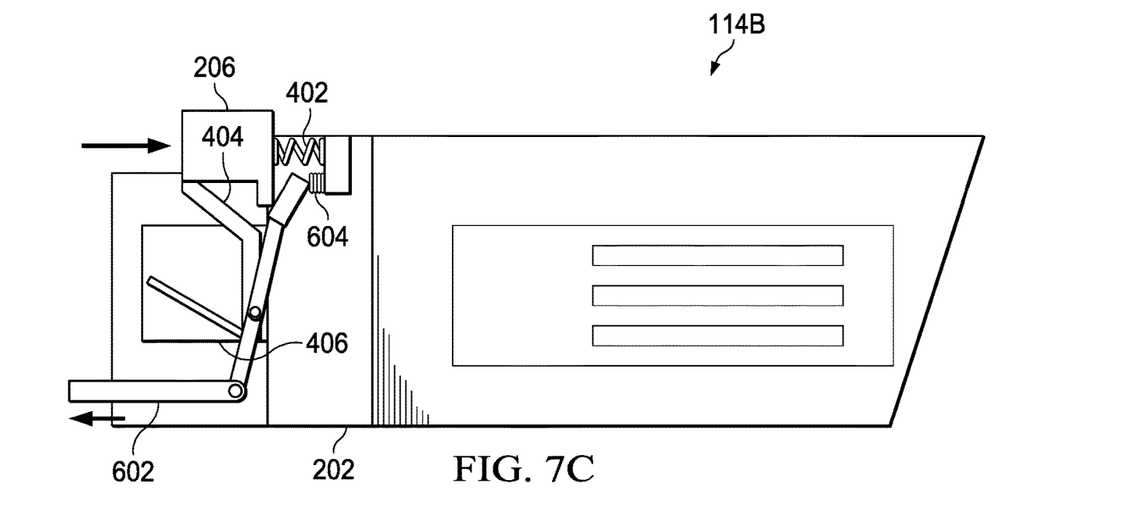

FIGS. 7A-7C illustrate different views of the example optical transceiver module 114B shown in FIGS. 6A-6C with slide release latch 206 in a second position, in accordance with embodiments of the present disclosure. FIG. 7A illustrates a front elevation view of optical transceiver module 114B, FIG. 7B illustrates a top plan view of optical transceiver module 114B, and FIG. 7C illustrates a side elevation view of optical transceiver module 114B.

As shown in FIGS. 7A-7C, as slide release latch 206 is translated from the first position to the second position, slide release latch 206 may mechanically interact with the one or more push levers 602, causing the one or more push levers 602 to mechanically interact with a cable 208 inserted into optical transceiver module 114B in order to safely eject the cable 208 from optical transceiver module 114B.

Although the foregoing contemplates the use of the methods and systems disclosed herein in direct attached copper and active optical cable solutions, embodiments disclosed herein may be extended for use in unique form factors and constraints of pluggable optical transceivers.

Although the foregoing contemplates the use of the methods and systems disclosed herein with respect to cable-attached optical transceiver modules, the heat transfer techniques disclosed herein may be applied generally to any active device module having a heat-generating device coupled to a cable, including without limitation transceiver modules other than optical transceiver modules.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An active device module, comprising:
    an active device;
    a housing configured to house the active device;
    a slide release latch mechanically coupled to the housing via a spring having a spring force that biases the slide release latch in a first position relative to the housing; and
    connectivity flaps mechanically coupled to the slide release latch via activation levers, wherein when the slide release latch is in the first position and a cable is inserted into the active device module, the connectivity flaps apply a compressive force to either side of the cable to mechanically maintain the cable within the active device module;
    wherein the housing, the slide release latch, the activation levers, and the connectivity flaps are arranged such that, when an external force is applied to the slide release latch to overcome the spring force of the spring to cause the slide release latch to move from the first position to a second position relative to the housing, the slide release latch exerts mechanical force on the activation levers, which in turn applies a force to the connectivity flaps, pulling at least a portion of each connectivity flap away from another connectivity flap, thereby reducing the compressive force retaining the cable between the connectivity flaps.

2. The active device module of claim 1, wherein the active device is an optical transceiver.

3. The active device module of claim 1, further comprising:
    a push lever mechanically coupled to the housing via a second spring that biases the push lever in a resting position relative to the housing; and
    wherein the housing, the slide release latch, and the push lever are arranged such that, when the external force is applied to the slide release latch to cause the slide release latch to move from the first position to the second position relative to the housing, the slide release latch exerts mechanical force on the push lever, causing motion of the push lever from the resting position to eject the cable from the active device module.

4. A method for fabricating an active device module comprising:
    housing an active device within a housing;
    mechanically coupling a slide release latch to the housing via a spring having a spring force that biases the slide release latch in a first position relative to the housing;
    mechanically coupling connectivity flaps to the slide release latch via activation levers, wherein when the slide release latch is in the first position and a cable is inserted into the active device module, the connectivity flaps apply a compressive force to either side of the cable to mechanically maintain the cable within the active device module; and
    arranging the housing, the slide release latch, the activation levers, and the connectivity flaps such that, when an external force is applied to the slide release latch to overcome the spring force of the spring to cause the slide release latch to move from the first position to a second position relative to the housing, the slide release latch exerts mechanical force on the activation levers, which in turn applies a force to the connectivity flaps, pulling at least a portion of each connectivity flap away from another connectivity flap, thereby reducing the compressive force retaining the cable between the connectivity flaps.

5. The method of claim 4, wherein the active device is an optical transceiver.

6. The method of claim 4, further comprising:
    mechanically coupling a push lever to the housing via a second spring that biases the push lever in a resting position relative to the housing; and
    arranging the housing, the slide release latch, and the push lever such that, when the external force is applied to the slide release latch to cause the slide release latch to move from the first position to the second position relative to the housing, the slide release latch exerts mechanical force on the push lever, causing motion of the push lever from the resting position to eject the cable from the active device module.

7. An information handling system, comprising:
    a processor; and
    an active device module communicatively coupled to the processor and comprising:
        an active device;
        a housing configured to house the active device;

a slide release latch mechanically coupled to the housing via a spring having a spring force that biases the slide release latch in a first position relative to the housing; and connectivity flaps mechanically coupled to the slide release latch via activation levers, wherein when the slide release latch is in the first position and a cable is inserted into the active device module, the connectivity flaps apply a compressive force to either side of the cable to mechanically maintain the cable within the active device module;

wherein the housing, the slide release latch, the activation levers, and the connectivity flaps are arranged such that, when an external force is applied to the slide release latch to overcome the spring force of the spring to cause the slide release latch to move from the first position to a second position relative to the housing, the slide release latch exerts mechanical force on the activation levers, which in turn applies a force to the connectivity flaps, pulling at least a portion of each connectivity flap away from another connectivity flap, thereby reducing the compressive force retaining the cable between the connectivity flaps.

8. The information handling system of claim 7, wherein the active device is an optical transceiver.

9. The information handling system of claim 7, the active device module further comprising:

a push lever mechanically coupled to the housing via a second spring that biases the push lever in a resting position relative to the housing; and wherein the housing, the slide release latch, and the push lever are arranged such that, when the external force is applied to the slide release latch to cause the slide release latch to move from the first position to the second position relative to the housing, the slide release latch exerts mechanical force on the push lever, causing motion of the push lever from the resting position to eject the cable from the active device module.

* * * * *